(12) United States Patent
Kopko et al.

(10) Patent No.: US 10,812,005 B2
(45) Date of Patent: Oct. 20, 2020

(54) VARIABLE SPEED DRIVE WITH A BATTERY

(71) Applicant: Johnson Controls Technology Company, Auburn Hills, MI (US)

(72) Inventors: William L. Kopko, Jacobus, PA (US); Israel Federman, Boca Raton, FL (US); Jay A. Kohler, York, PA (US); Ivan Jadric, York, PA (US)

(73) Assignee: Johnson Controls Technology Company, Auburn Hills, MI (US)

( * ) Notice: Subject to any disclaimer, the term of this patent is extended or adjusted under 35 U.S.C. 154(b) by 0 days.

(21) Appl. No.: 16/339,329

(22) PCT Filed: Oct. 5, 2017

(86) PCT No.: PCT/US2017/055373
§ 371 (c)(1),
(2) Date: Apr. 3, 2019

(87) PCT Pub. No.: WO2018/067839
PCT Pub. Date: Apr. 12, 2018

(65) Prior Publication Data
US 2019/0238081 A1    Aug. 1, 2019

Related U.S. Application Data

(60) Provisional application No. 62/404,646, filed on Oct. 5, 2016.

(51) Int. Cl.
*H02P 27/06*    (2006.01)
*H02J 9/06*    (2006.01)
(Continued)

(52) U.S. Cl.
CPC ............... *H02P 27/06* (2013.01); *G05F 1/46* (2013.01); *H02J 7/04* (2013.01); *H02J 9/062* (2013.01);
(Continued)

(58) Field of Classification Search
CPC ...... H02P 1/00; H02P 1/04; H02P 1/46; H02P 1/24; H02P 3/00; H02P 3/18; H02P 21/00;
(Continued)

(56) References Cited

U.S. PATENT DOCUMENTS 7,081,734 B1 * 7/2006 Jadric .................. H02M 7/797
                                                     318/767
8,193,660 B2 * 6/2012 Rockenfeller ........ F25B 49/022
                                                     165/58
(Continued)

FOREIGN PATENT DOCUMENTS

EP    2955456 A2    12/2015
JP    H1118319 A     1/1999
(Continued)

OTHER PUBLICATIONS

International Search Report and Written Opinion for PCT Application No. PCT/US2017/055373 dated Dec. 21, 2017, 17 pgs.
(Continued)

*Primary Examiner* — Antony M Paul
(74) *Attorney, Agent, or Firm* — Fletcher Yoder, P.C.

(57) ABSTRACT

Embodiments of the present disclosure relate to a heating, ventilating, air conditioning, and refrigeration (HVAC&R) system that includes a variable speed drive (VSD) configured to supply power to a motor configured to drive a compressor of the HVAC&R system, a rectifier of the VSD configured to receive alternating current (AC) power from an AC power source and convert the AC power to direct
(Continued)

current (DC) power, a DC bus of the VSD electrically coupled to the rectifier, an inverter of the VSD electrically coupled to the DC bus, where the inverter is configured to convert the DC power to output AC power, the output AC power has a variable voltage and a variable frequency, and the output AC power is directed to the motor, and a battery electrically coupled to the DC bus, where the battery is configured to provide auxiliary DC power to the VSD.

18 Claims, 8 Drawing Sheets

(51) Int. Cl.
  *H02P 27/08* (2006.01)
  *G05F 1/46* (2006.01)
  *H02J 7/04* (2006.01)
  *H02M 5/458* (2006.01)

(52) U.S. Cl.
  CPC .......... *H02M 5/4585* (2013.01); *H02P 27/08* (2013.01); *H02P 2201/01* (2013.01)

(58) Field of Classification Search
  CPC ...... H02P 6/00; H02P 6/12; H02P 6/14; H02P 23/00; H02P 25/00; H02P 27/00; H02P 27/04; H02P 27/06; H02P 27/08
  USPC .... 318/400.01, 400.02, 400.14, 400.15, 700, 318/701, 721, 779, 799, 800, 801, 430, 318/432
  See application file for complete search history.

(56) References Cited

U.S. PATENT DOCUMENTS

| | | | |
|---|---|---|---|
| 8,299,646 B2* | 10/2012 | Rockenfeller | ............ H02P 5/74 165/58 |
| 9,228,750 B2* | 1/2016 | Rockenfeller | ............ F24F 3/00 |
| 2011/0018349 A1* | 1/2011 | Rockenfeller | ........ F25B 49/022 307/66 |
| 2012/0191252 A1 | 7/2012 | Rockenfeller et al. | |

FOREIGN PATENT DOCUMENTS

| | | | | |
|---|---|---|---|---|
| JP | H11325545 A | | 11/1999 | |
| JP | 2006246699 A | | 9/2006 | |
| JP | 2010154650 A | * | 7/2010 | ............. H02P 27/06 |
| JP | 2010154650 A | | 7/2010 | |
| JP | 2011045153 A | | 3/2011 | |
| JP | 2013121290 A | | 6/2013 | |
| KR | 20060114039 A | | 11/2006 | |
| KR | 20080089610 A | | 10/2008 | |
| KR | 20090089378 A | | 8/2009 | |

OTHER PUBLICATIONS

Japanese Notice of Allowance for JP Application No. 2019-518106, dated Jul. 22, 2020, 4 pg.
Korean Office Action for KR Application No. 10-2019-7012498 dated Jul. 22, 2020, 8 pg.

* cited by examiner

VARIABLE SPEED DRIVE WITH A BATTERY

CROSS REFERENCE TO RELATED APPLICATIONS

This application claims priority from and the benefit of U.S. Provisional Application Ser. No. 62/404,646, filed Oct. 5, 2016, entitled "VARIABLE SPEED DRIVE WITH BATTERY," which is hereby incorporated by reference in its entirety for all purposes.

BACKGROUND

This application relates generally to heating, ventilating, air conditioning, and refrigeration (HVAC&R) systems, and, more particularly, to a battery for a variable speed drive of a HVAC&R system.

HVAC&R systems are utilized in residential, commercial, and industrial environments to control environmental properties, such as temperature and humidity, for occupants of the respective environments. In some cases, the HVAC&R system may include a vapor compression system, which circulates a working fluid along a refrigerant loop. The working fluid is configured to change phases between vapor, liquid, and combinations thereof in response to being subjected to different temperatures and pressures associated with operation of the vapor compression system. For example, the vapor compression system utilizes a compressor to circulate the working fluid to a heat exchanger which may transfer heat between the refrigerant and another fluid flowing through the heat exchanger. In some cases, the compressor is driven by a motor, which receives power from a variable speed drive. Existing variable speed drives for HVAC&R systems are electrically coupled to a power grid, and thus, may experience interruptions and/or inconsistencies in the power supply from the power grid.

SUMMARY

In one embodiment a heating, ventilating, air conditioning, and refrigeration (HVAC&R) system includes a variable speed drive configured to supply power to a motor, where the motor is configured to drive a compressor of the HVAC&R system, a rectifier of the variable speed drive configured to receive alternating current (AC) power from an AC power source and convert the AC power to direct current (DC) power, a DC bus of the variable speed drive electrically coupled to the rectifier, where the DC bus is configured to modify the DC power received from the rectifier, an inverter of the variable speed drive electrically coupled to the DC bus, where the inverter is configured to convert the DC power from the DC bus to output AC power, where the output AC power has a variable voltage and a variable frequency, and wherein the output AC power is directed to the motor, and a battery electrically coupled to the DC bus of the variable speed drive, wherein the battery is configured to provide auxiliary DC power to the variable speed drive.

In another embodiment a variable speed drive for a heating, ventilating, air conditioning, and refrigeration (HVAC&R) system includes a rectifier of the variable speed drive configured to receive alternating current (AC) power from an AC power source and convert the AC power to direct current (DC) power, a DC bus of the variable speed drive electrically coupled to the rectifier, wherein the DC bus is configured to amplify or reduce a voltage of the DC power received from the rectifier, an inverter of the variable speed drive electrically coupled to the DC bus, where the inverter is configured to convert the DC power from the DC bus to output AC power, where the output AC power has a variable voltage and a variable frequency, and where the output AC power is directed to the motor, a battery electrically coupled to the DC bus of the variable speed drive, wherein the battery is configured to provide auxiliary DC power to the variable speed drive, and a charger electrically coupled to the AC power source and the battery, wherein the charger is configured to receive AC power from the AC power source and provide DC power to the battery.

In another embodiment a method includes monitoring a voltage of alternating current (AC) power directed from an AC power source to a variable speed drive, using the AC power from the AC power source to operate a motor with the variable speed drive when the AC power is above a threshold, and directing power to the variable speed drive from a battery to operate the motor with the variable speed drive when the AC power is at or below the threshold.

DETAILED DESCRIPTION

Figure 1:
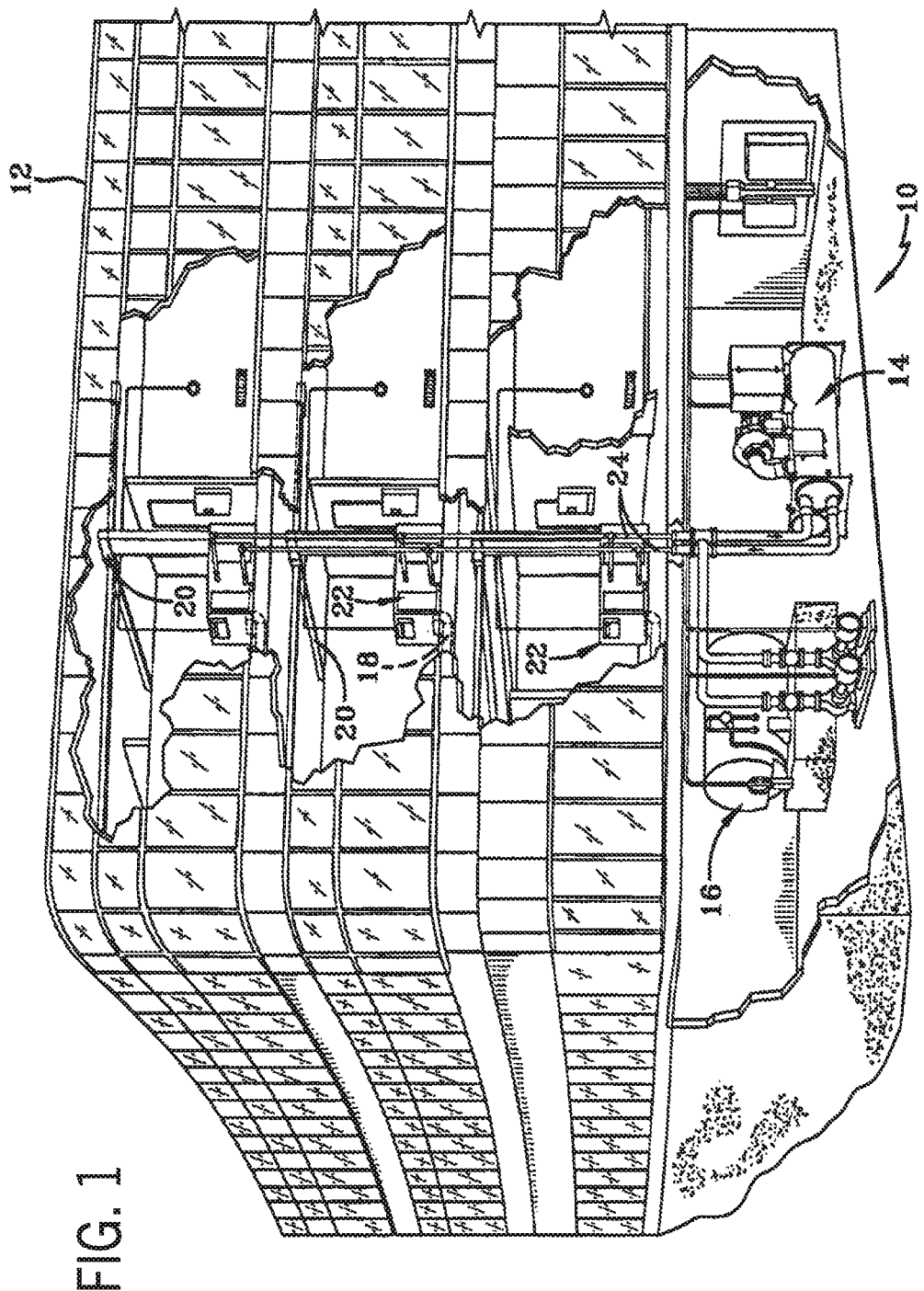
FIG. 1 is a perspective view of an embodiment of a building that may utilize a heating, ventilation, air conditioning, and refrigeration (HVAC&R) system in a commercial setting, in accordance with an aspect of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Embodiments of the present disclosure are directed towards a heating, ventilating, air conditioning, and refrigeration (HVAC&R) system that uses a variable speed drive having a battery. As discussed above, variable speed drives may be coupled to a motor that drives a compressor of the HVAC&R system. Existing variable speed drives are electrically coupled to a power grid, which supplies alternating current (AC) power to the variable speed drive at a constant voltage and/or a constant frequency. In some cases, the power supplied to the variable speed drive from the power grid may experience interruptions as a result of severe weather events, natural disasters, routine maintenance, and/or other events that may disrupt the power supply. Accordingly, it may be desirable to electrically couple variable speed drives to a battery to supply auxiliary power to the variable speed drive when interruptions to the power supply from the power grid occur. Additionally, costs of the power supplied from the power grid may fluctuate based on demand, time of year, and/or time of day. As such, the battery may supply auxiliary power to the variable speed drive during peak demand hours when the cost of the power from the power grid is relatively high. Therefore, the battery electrically coupled to the variable speed drive may enable the variable speed drive to receive power when the power grid experiences interruptions and/or to reduce operating costs of the HVAC&R system.

In some embodiments, the variable speed drive is electrically coupled to the battery via a direct current (DC) bus of the variable speed drive. As should be understood, batteries generally provide power in the form of DC power. Additionally, variable speed drives convert AC power from the power grid (e.g., an AC power source) into DC power using a rectifier, and then convert the DC power back to AC power that may have a variable voltage and/or a variable frequency using an inverter. Thus, the battery may supply DC power to a portion of the variable speed drive that utilizes DC power and enable the variable speed drive to convert the DC power into AC power having a variable voltage and/or variable frequency. Embodiments of the present disclosure may include a variety of rectifiers and inverters that may be utilized to enhance a performance of the variable speed drive when receiving power from the power grid and/or auxiliary power from the battery. Further, in some embodiments, the variable speed drive may include a charging element that receives and stores power from the power grid to use for charging the battery, thereby increasing an amount of time that the battery may supply auxiliary power to the variable speed drive.

Turning now to the drawings, FIG. 1 is a perspective view of an embodiment of an environment for a heating, ventilation, air conditioning, and refrigeration (HVAC&R) system 10 in a building 12 for a typical commercial setting. The HVAC&R system 10 may include a vapor compression system 14 that supplies a chilled liquid, which may be used to cool the building 12. The HVAC&R system 10 may also include a boiler 16 to supply warm liquid to heat the building 12 and an air distribution system which circulates air through the building 12. The air distribution system can also include an air return duct 18, an air supply duct 20, and/or an air handler 22. In some embodiments, the air handler 22 may include a heat exchanger that is connected to the boiler 16 and the vapor compression system 14 by conduits 24. The heat exchanger in the air handler 22 may receive either heated liquid from the boiler 16 or chilled liquid from the vapor compression system 14, depending on the mode of operation of the HVAC&R system 10. The HVAC&R system 10 is shown with a separate air handler on each floor of building 12, but in other embodiments, the HVAC&R system 10 may include air handlers 22 and/or other components that may be shared between or among floors.

Figure 2:
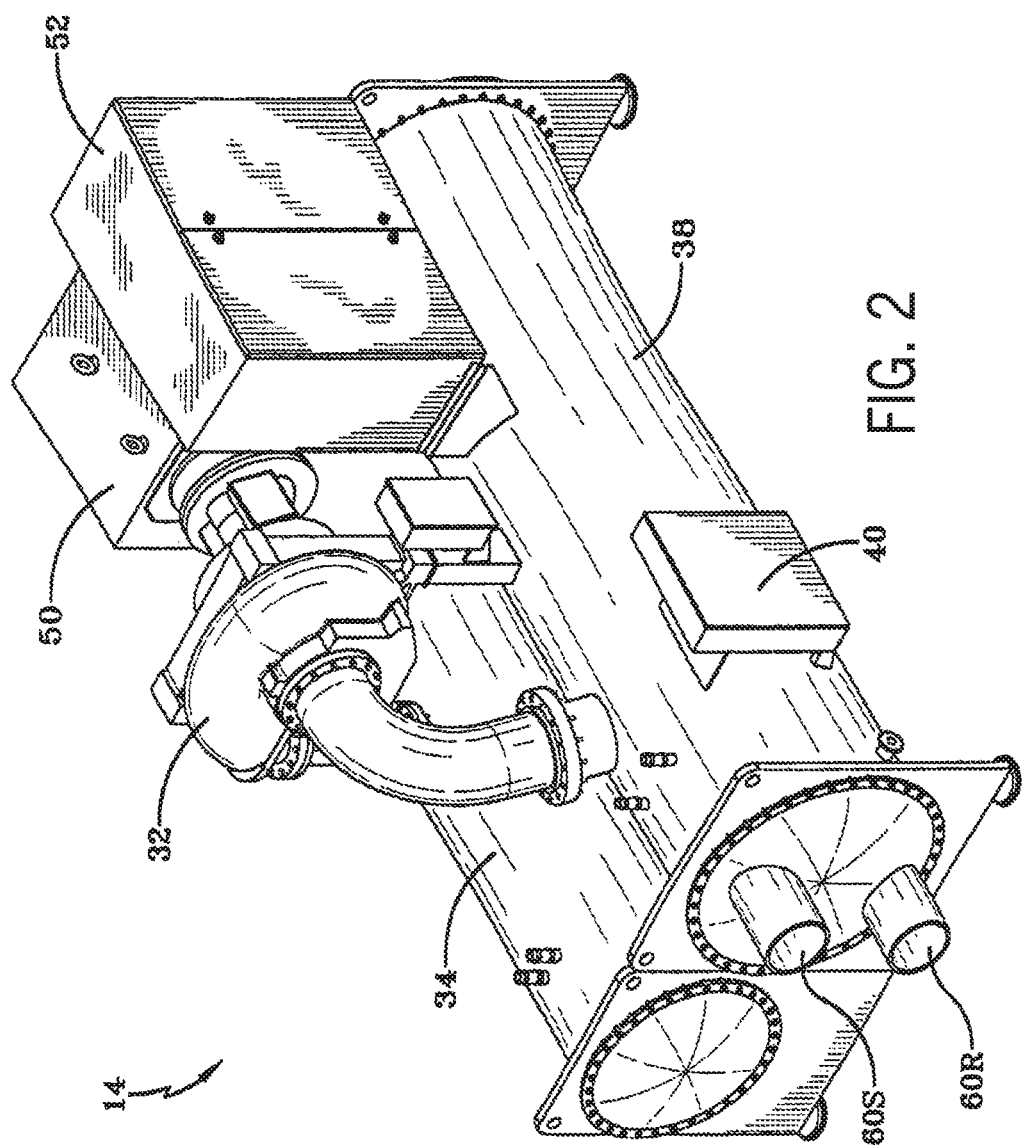
FIG. 2 is a perspective view of a vapor compression system, in accordance with an aspect of the present disclosure.
Figure 3:
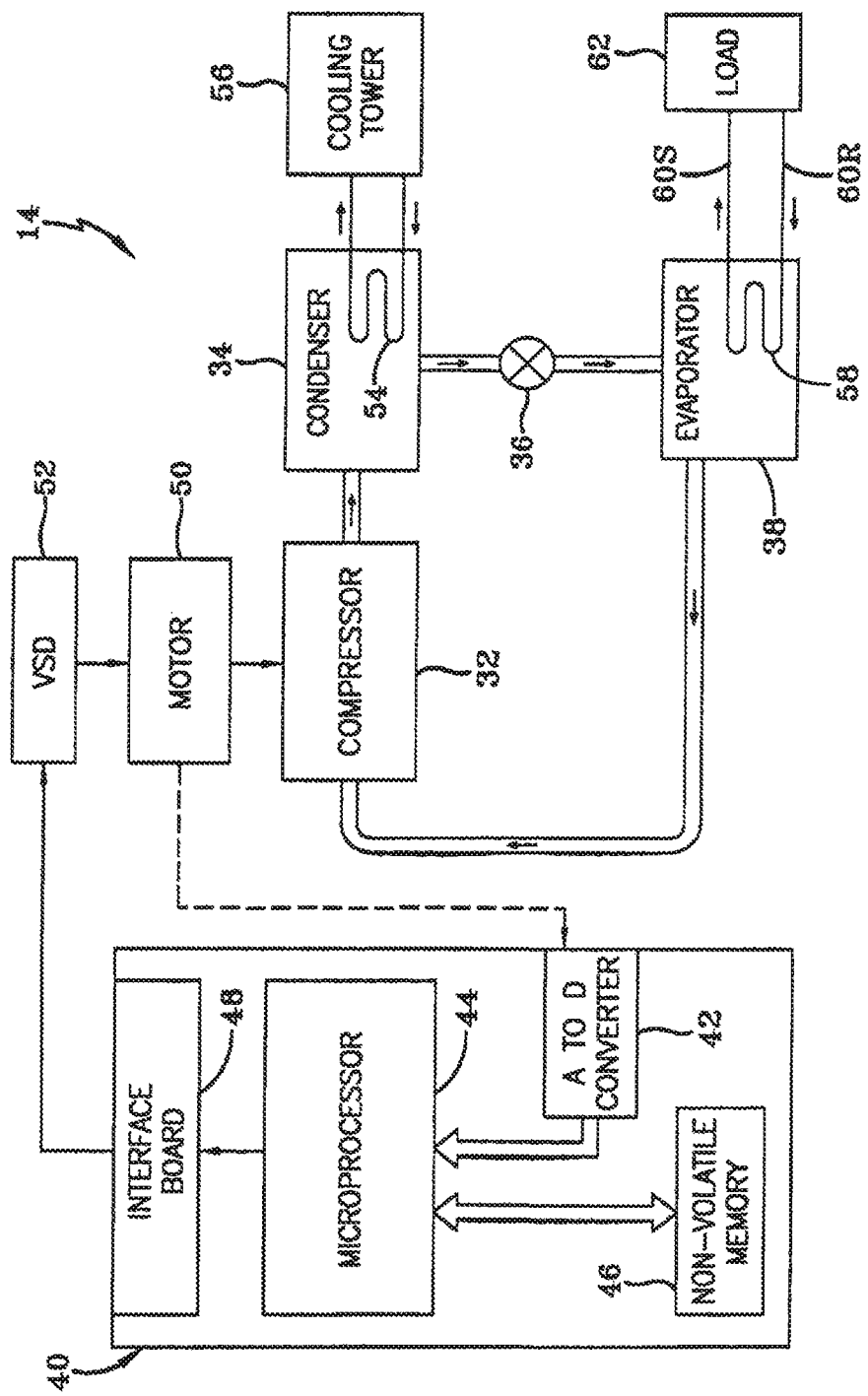
FIG. 3 is a schematic of an embodiment of the vapor compression system of FIG. 2, in accordance with an aspect of the present disclosure.

FIGS. 2 and 3 are embodiments of the vapor compression system 14 that can be used in the HVAC&R system 10. The vapor compression system 14 may circulate a refrigerant through a circuit starting with a compressor 32. The circuit may also include a condenser 34, an expansion valve(s) or device(s) 36, and a liquid cooler or an evaporator 38. The vapor compression system 14 may further include a control panel 40 that has an analog to digital (A/D) converter 42, a microprocessor 44, a non-volatile memory 46, and/or an interface board 48.

Some examples of fluids that may be used as refrigerants in the vapor compression system 14 are hydrofluorocarbon (HFC) based refrigerants, for example, R-410A, R-407, R-134a, hydrofluoro olefin (HFO), "natural" refrigerants like ammonia ($NH_3$), R-717, carbon dioxide ($CO_2$), R-744, or hydrocarbon based refrigerants, water vapor, or any other suitable refrigerant. In some embodiments, the vapor compression system 14 may be configured to efficiently utilize refrigerants having a normal boiling point of about 19 degrees Celsius (66 degrees Fahrenheit) at one atmosphere of pressure, also referred to as low pressure refrigerants, versus a medium pressure refrigerant, such as R-134a. As used herein, "normal boiling point" may refer to a boiling point temperature measured at one atmosphere of pressure.

In some embodiments, the vapor compression system 14 may use one or more of a variable speed drive (VSDs) 52, a motor 50, the compressor 32, the condenser 34, the expansion valve or device 36, and/or the evaporator 38. The motor 50 may drive the compressor 32 and may be powered by a variable speed drive (VSD) 52. The VSD 52 receives alternating current (AC) power having a particular fixed line voltage and fixed line frequency from an AC power source, and provides power having a variable voltage and frequency to the motor 50. In other embodiments, the motor 50 may be powered directly from an AC or direct current (DC) power source. The motor 50 may include any type of electric motor that can be powered by a VSD or directly from an AC or DC power source, such as a switched reluctance motor, an induction motor, an electronically commutated permanent magnet motor, or another suitable motor.

The HVAC&R system may include a chiller, air-conditioner, heat pump, rooftop unit, refrigeration system, variable-refrigerant-flow (VRF) system, another suitable component, or any combination thereof. The HVAC&R system generally includes one or more motor-driven components, such as compressors, pumps, fans, etc., which may be driven by a variable speed drive. In some embodiments, more than one component may be driven from a single variable speed drive. For example, several fans may share a single variable speed drive, or two or more compressors may share a single variable speed drive. Additionally or alternatively, multiple variable speed drives may be included in a single HVAC&R system. For example, an HVAC&R system may include a first variable speed drive for one or more compressors, a second variable speed drive for condenser fans, and a third variable speed drive for an evaporator pump. In still further embodiments, any suitable number of variable speed drives may be included in an HVAC&R system to supply sufficient power to the components of the HVAC&R system.

The compressor 32 compresses a refrigerant vapor and delivers the vapor to the condenser 34 through a discharge passage. In some embodiments, the compressor 32 may be a centrifugal compressor. The refrigerant vapor delivered by the compressor 32 to the condenser 34 may transfer heat to a cooling fluid (e.g., water or air) in the condenser 34. The refrigerant vapor may condense to a refrigerant liquid in the condenser 34 as a result of thermal heat transfer with the cooling fluid. The liquid refrigerant from the condenser 34 may flow through the expansion device 36 to the evaporator 38. In the illustrated embodiment of FIG. 3, the condenser 34 is water cooled and includes a tube bundle 54 connected to a cooling tower 56, which supplies the cooling fluid to the condenser.

The liquid refrigerant delivered to the evaporator 38 may absorb heat from another cooling fluid, which may or may not be the same cooling fluid used in the condenser 34. The liquid refrigerant in the evaporator 38 may undergo a phase change from the liquid refrigerant to a refrigerant vapor. As shown in the illustrated embodiment of FIG. 3, the evaporator 38 may include a tube bundle 58 having a supply line 60S and a return line 60R connected to a cooling load 62. The cooling fluid of the evaporator 38 (e.g., water, ethylene glycol, calcium chloride brine, sodium chloride brine, or any other suitable fluid) enters the evaporator 38 via return line 60R and exits the evaporator 38 via supply line 60S. The evaporator 38 may reduce the temperature of the cooling fluid in the tube bundle 58 via thermal heat transfer with the refrigerant. The tube bundle 58 in the evaporator 38 can include a plurality of tubes and/or a plurality of tube bundles. In any case, the vapor refrigerant exits the evaporator 38 and returns to the compressor 32 by a suction line to complete the cycle.

Figure 4:
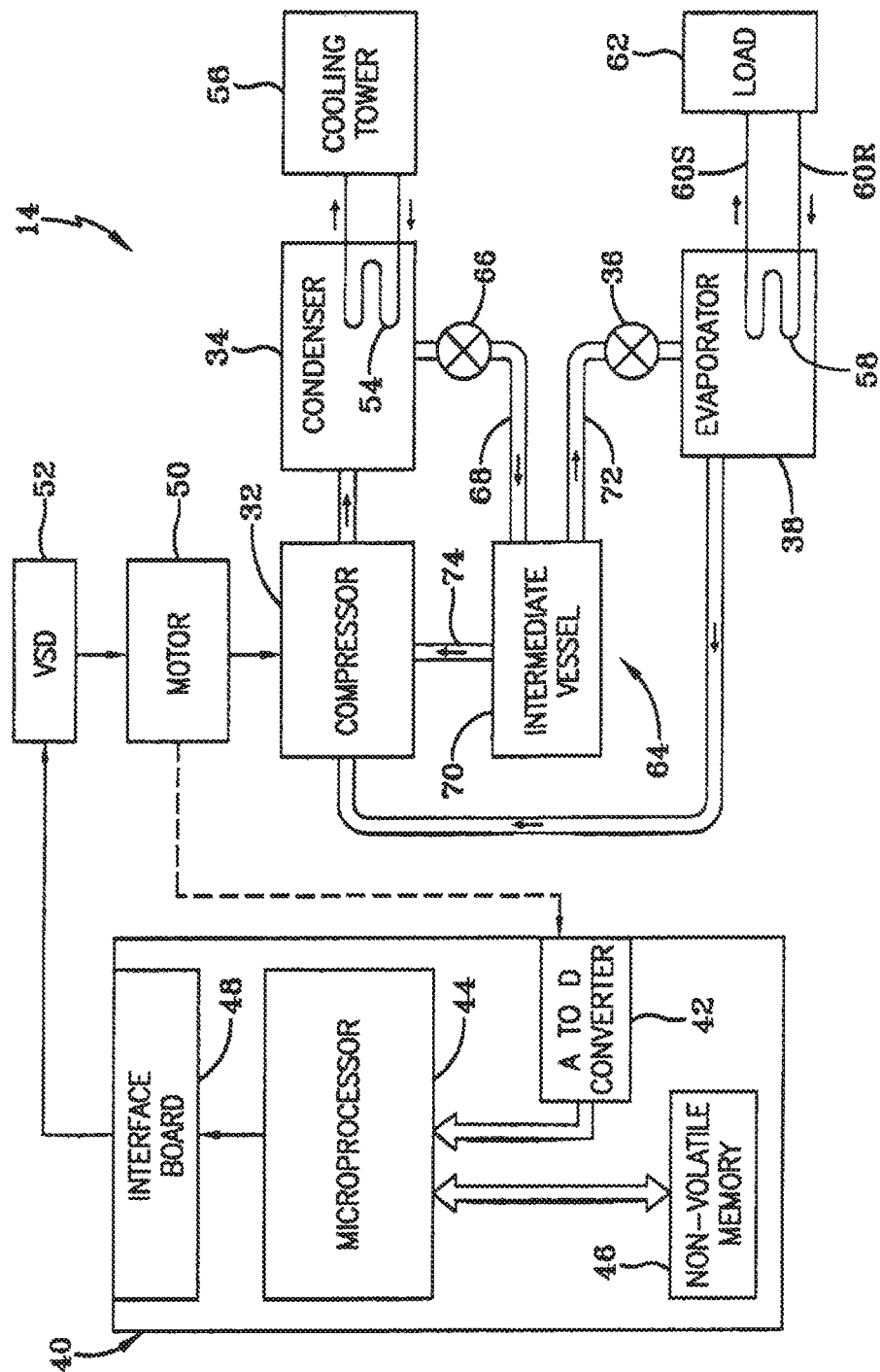
FIG. 4 is a schematic of an embodiment of the vapor compression system of FIG. 2, in accordance with an aspect of the present disclosure.

FIG. 4 is a schematic of the vapor compression system 14 with an intermediate circuit 64 incorporated between condenser 34 and the expansion device 36. The intermediate circuit 64 may have an inlet line 68 that is directly fluidly connected to the condenser 34. In other embodiments, the inlet line 68 may be indirectly fluidly coupled to the condenser 34. As shown in the illustrated embodiment of FIG. 4, the inlet line 68 includes a first expansion device 66 positioned upstream of an intermediate vessel 70. In some embodiments, the intermediate vessel 70 may be a flash tank (e.g., a flash intercooler). In other embodiments, the intermediate vessel 70 may be configured as a heat exchanger or a "surface economizer." In the illustrated embodiment of FIG. 4, the intermediate vessel 70 is used as a flash tank, and the first expansion device 66 is configured to lower the pressure of (e.g., expand) the liquid refrigerant received from the condenser 34. During the expansion process, a portion of the liquid may vaporize, and thus, the intermediate vessel 70 may be used to separate the vapor from the liquid received from the first expansion device 66. Additionally, the intermediate vessel 70 may provide for further expansion of the liquid refrigerant because of a pressure drop experienced by the liquid refrigerant when entering the intermediate vessel 70 (e.g., due to a rapid increase in volume experienced when entering the intermediate vessel 70). The vapor in the intermediate vessel 70 may be drawn by the compressor 32 through a suction line 74 of the compressor 32. In other embodiments, the vapor in the intermediate vessel may be drawn to an intermediate stage of the compressor 32 (e.g., not the suction stage). The liquid that collects in the intermediate vessel 70 may be at a lower enthalpy than the liquid refrigerant exiting the condenser 34 because of the expansion in the expansion device 66 and/or the intermediate vessel 70. The liquid from intermediate vessel 70 may then flow in line 72 through a second expansion device 36 to the evaporator 38.

As noted above, the variable speed drive 52 may include a battery for supplying auxiliary power to the variable speed drive, and thus, ultimately supplying power to the motor 50 and the compressor 52. In some cases, interruptions to power supplied to the variable speed drive 52 by a power grid may occur, thereby leading to a shutdown of the vapor compression system 14. As such, the battery may provide auxiliary power to the variable speed drive 52 when such interruptions occur and/or when a cost of power from the power grid is relatively high. As discussed in detail herein, the variable speed drive 52 may include various rectifier configurations, inverter configurations, and/or additional components to accommodate the battery and enable the battery to adequately supply power to the variable speed drive 52.

Figure 5:
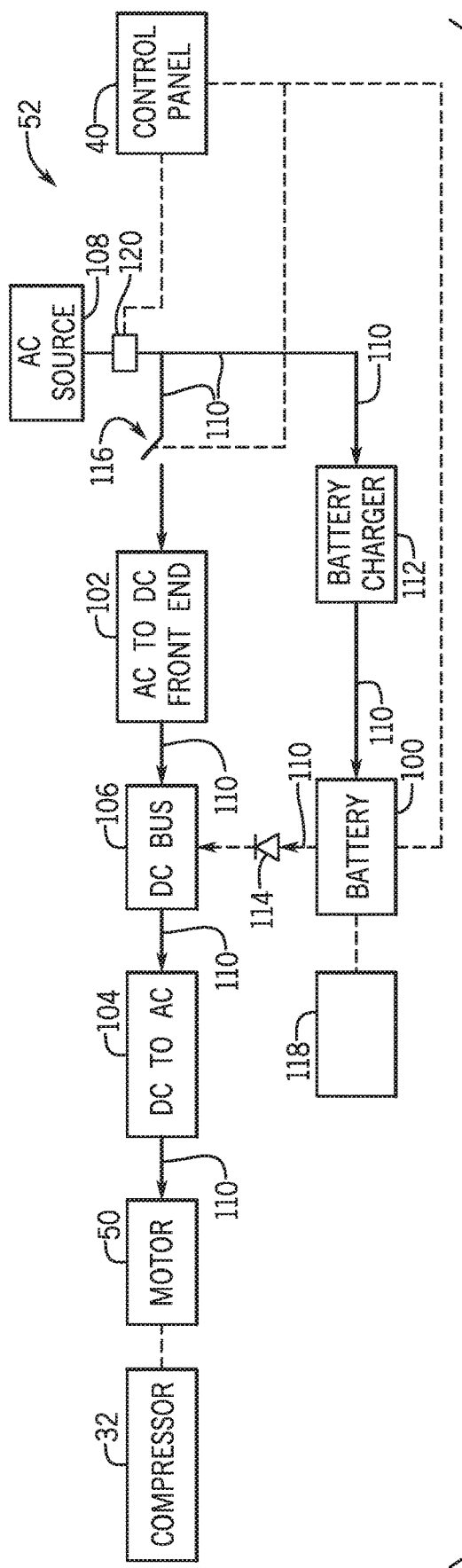
FIG. 5 is a schematic of an embodiment of a variable speed drive of the vapor compression system of FIGS. 2-4, in accordance with an aspect of the present disclosure.

For example, FIG. 5 is a schematic of an embodiment of the variable speed drive 52 having a battery 100. As shown in the illustrated embodiment of FIG. 5, the variable speed drive 52 may include a rectifier 102, an inverter 104, and a DC bus 106. The rectifier 102 receives AC power at a constant voltage and frequency and converts the AC power into DC power. The DC bus 106 may then manipulate or transform the DC power (e.g., buck or boost the DC power) to reach a predetermined voltage and frequency, which may be based on a load demand of the motor 50. The inverter 104 may then transfer the DC power back to AC power that includes a variable voltage and frequency. The AC power from the inverter 104 is utilized to power the motor 50, which drives the compressor 32 of the vapor compression system.

As shown in the illustrated embodiment of FIG. 5, the battery 100 may be coupled to the DC bus 106 of the variable speed drive 52, such that the battery 100 may supply auxiliary power to the variable speed drive 52 and ultimately power the motor, independent of an AC power source 108 (e.g., a power grid). For example, the battery 100 may supply DC power to the variable speed drive 52, such that the auxiliary power from the battery 100 may be received at the DC bus 106, but not at the rectifier 102 and/or the inverter 104. In some embodiments, the battery 100 may be external to the variable speed drive 52, but coupled to circuitry 110 of the variable speed drive 52 via the DC bus 106. As used herein, the battery 100 may be a plurality of batteries that each include one or more battery cells. For example, the battery 100 may include 2, 3, 4, 5, 6, 7, 8, 9, 10, or more batteries coupled to one another in a series or parallel arrangement. In some embodiments, the battery 100 may store and/or supply between 100 kilowatts (kW) and 50,000 kW, between 200 kW and 40,000 kW, or between 500 kW and 25,000 kW of power.

As shown in the illustrated embodiment of FIG. 5, a battery charger 112 may be coupled to the battery 100 and/or the AC power source 108. For example, the battery charger 112 is coupled to the AC power source 108, and thus, receives and conditions (e.g., filters and/or modifies) energy from the AC power source 108. The energy conditioned by the battery charger 112 may be used to recharge the battery 100 and/or otherwise provide power to the battery 100. Additionally, the circuitry 110 of the variable speed drive 52 may include a diode 114 coupled between the battery 100 and the DC bus 106 of the variable speed drive 52. The diode 114 may block power from flowing from the variable speed drive 52 (e.g., the DC bus 102) back to the battery 100, but facilitate a flow of the power from the battery 100 to the DC bus 106.

Additionally, the variable speed drive 52 of FIG. 5 may include a switch 116 configured to disconnect (e.g., electrically isolate) the variable speed drive 52 from the AC power source 108 (e.g., interrupt the connection between the variable speed drive 52 and the AC power source 108). As a non-limiting example, when a cost of power supplied by the AC power source 108 is relatively high, the connection between the AC power source 108 and the variable speed drive 52 may be disconnected, such that the variable speed drive 52 does not draw power from the AC power source 108. In such cases, the variable speed drive 52 may draw auxiliary power from the battery 100. In some embodiments, the inverter 104 of the variable speed drive 52 may lower a frequency of the output power (e.g., to the motor 50) to maintain a sufficient amount of torque applied to the motor 50 when the battery 100 supplies power to the variable speed drive 52. Additionally or alternatively, the variable speed drive 52 may include an additional, external inverter 118 that may be configured to provide power to a control panel, fans, pumps, and/or other components of the battery 100 when power from the AC power source 108 is interrupted.

Additionally, FIG. 5 shows the variable speed drive 52 having a sensor 120 that may measure a voltage and/or frequency of the AC power supplied to the variable speed drive 52 by the AC power source 108. In some embodiments, the control panel 40 may be communicatively coupled to the sensor 120, the battery 100, and/or the switch 116 of the variable speed drive 52. Accordingly, the control panel 40 may receive feedback indicative of the AC power received from the AC power source 108 from the sensor 120 and adjust the circuitry 110 of the variable speed drive 52 in response to the feedback received from the sensor 120. For example, when the feedback from the sensor 120 reaches and/or falls below a threshold, the control panel 40 may open the switch 116 and activate the battery 100, such that the battery 100 supplies power to the DC bus 106 of the variable speed drive 52. Additionally or alternatively, when the feedback from the sensor 120 exceeds the threshold, the switch 116 may be closed and the battery may be deactivated, such that power is supplied to the variable speed drive 52 from the AC power source 108. In still further embodiments, the control panel 40 may monitor a speed of the motor 50 and/or a discharge pressure of the compressor 32 and adjust the circuitry 110 of the variable speed drive 52 accordingly. In some embodiments, the variable speed drive 52 may be configured to receive power from both the AC power source 108 and the battery 100 to supply a sufficient voltage to the motor 50.

Figure 6:
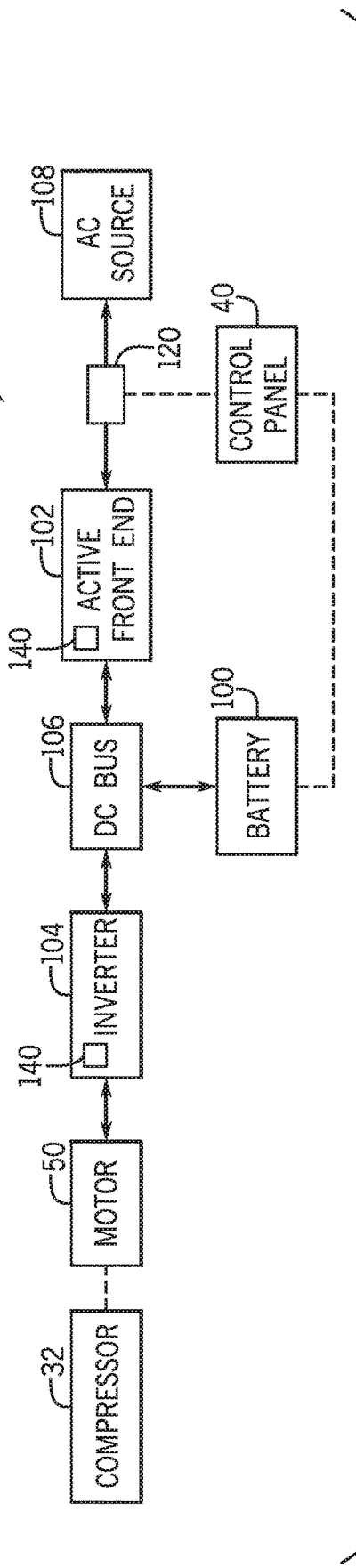
FIG. 6 is a schematic of an embodiment of a variable speed drive of the vapor compression system of FIGS. 2-4, in accordance with an aspect of the present disclosure.

FIG. 6 is a schematic of an embodiment of the variable speed drive 52 having the battery 100, but without the battery charger 112. For example, the variable speed drive 52 includes an insulated gate bipolar transistor ("IGBT") 140, which enables the flow of power in multiple directions (e.g., from the AC power source 108 to the variable speed drive 52 and from the variable speed drive 52 to the AC power source 108, from the variable speed drive 52 to the motor 50 and from the motor 50 to the variable speed drive 52, and/or from the rectifier 102 to the inverter 104 and from the inverter 104 to the rectifier 102). The IGBT may be included in the rectifier 102 and/or the inverter 104 to adjust power at the DC bus 106, such that a voltage of the power at the DC bus 106 is suitable for charging the battery 100. Accordingly, when power is supplied to the variable speed drive 52 from the AC power source 108, the battery 100 may charge as a result of power flowing through the DC bus to the battery 100. Therefore, the battery charger 112 is not included in the embodiment of the variable speed drive 52 of FIG. 6 because the battery 100 may be charged directly from the AC power source 108.

Additionally, the diode 114 is not included in the embodiment of the variable speed drive 52 of FIG. 6, such that power may flow either from the battery 100 to the variable speed drive 52 or toward the battery 100 from the variable speed drive 52. In some embodiments, the inverter 104 may supply power to the DC bus 106 from the motor 50 to provide regenerative breaking or slip energy recovery, thereby increasing an efficiency of the variable speed drive 52. In still further embodiments, the battery 100 may supply power to the AC power source 108. For example, when power from the AC power source 108 is interrupted (e.g., a power grid is shut down), it may be desirable to provide power to other components that may be coupled to the same electrical circuit (e.g., the same home or building) as the variable speed drive 52. For example, the variable speed drive 52 may be electrically connected to an electrical circuit of a residence or other building. Therefore, the battery 100 may supply power to one or more components that are also electrically coupled to the power circuit of the residence or other building when the AC power source 108 is interrupted.

Figure 7:
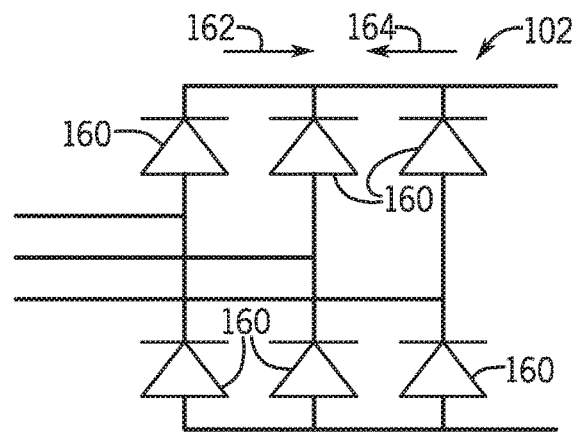
FIG. 7 is a schematic of an embodiment of a rectifier of the variable speed drive of FIGS. 5 and 6, in accordance with an aspect of the present disclosure.

As discussed above, the variable speed drive 52 may include various configurations of the rectifier 102, the inverter 104, and/or the DC bus 106 that may enhance a performance of the variable speed drive 52 when receiving power from either the AC power source 108 and/or the battery 100. For example, FIG. 7 is a schematic of an embodiment of the rectifier 102, which may be included in the variable speed drive 52 to convert AC power from the AC power source 108 into DC power. For example, the rectifier 102 of FIG. 7 includes a plurality of diodes 160 (e.g., P-N junction diodes) that convert the AC power into DC power. As shown in the illustrated embodiment of FIG. 7, the AC power may include three phase AC power, which is directed into the rectifier 102 via three corresponding inputs (e.g., wires). As such, each phase of the AC power may be electrically coupled to a pair of diodes of the plurality of diodes 160. The pair of diodes corresponding to each of the phases of the AC power may correspond to a positive and a negative terminal of a load (e.g., the battery 100). While the illustrated embodiment of FIG. 7 shows the rectifier 102 receiving three-phase AC power and having six diodes of the plurality of diodes 160, it should be noted that the rectifier 102 may receive AC power having any suitable number of phases (e.g., 1, 2, 4, 5, 6, 7, 8, 9, 10, or more) and may include any suitable number diodes (e.g., 1, 2, 3, 4, 5, 7, 8, 9, 10, or more) of the plurality of diodes 160.

The plurality of diodes 160 enable current to flow from the AC power source 108 and toward another component of the variable speed drive 52, such as the battery 100, the DC bus 106, the inverter 104, or a combination thereof. Thus, current may flow in a direction 162. The plurality of diodes 160 may block a flow of current in a direction 164, such that current may flow in the direction 162 but not in the direction 164. Accordingly, the rectifier 102 of FIG. 7 is a passive rectifier and may be utilized in the embodiment of the variable speed drive 52 illustrated in FIG. 5, but may not be suitable for the embodiment of the variable speed drive 52 illustrated in FIG. 6 because the rectifier 102 blocks the flow of current in the direction 164.

Figure 8:
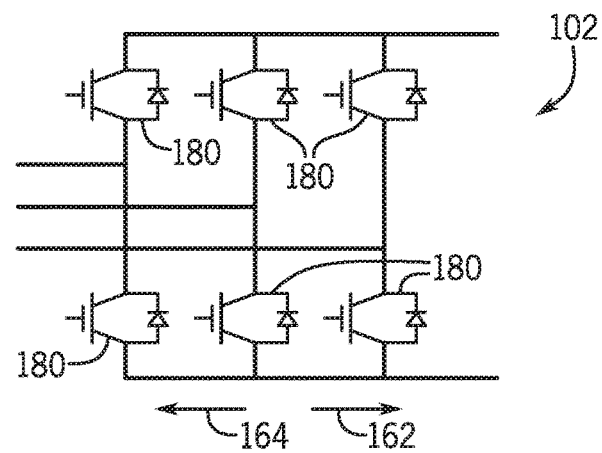
FIG. 8 is a schematic of an embodiment of a rectifier of the variable speed drive of FIGS. 5 and 6, in accordance with an aspect of the present disclosure.

FIG. 8 is an embodiment of the rectifier 102 that may be utilized in the embodiment of the variable speed drive 52 illustrated in FIG. 6. For example, in the illustrated embodiment of FIG. 8, the rectifier 102 includes a plurality of transistors 180 in lieu of the plurality of diodes 160. The plurality of transistors 180 may also be configured to convert AC power from the AC power source 108 to DC power. Furthermore, the plurality of transistors 180 may enable current to flow in both directions 162 and 164. Accordingly, the plurality of transistors 180 may also convert DC power back into AC power to enable current to flow from the motor 50 to an electrical circuit in which the variable speed drive 52 may be electrically connected (e.g., an electrical circuit of a residence or other structure). As such, the rectifier 102 is an active rectifier.

As shown in the illustrated embodiment of FIG. 8, the AC power from the AC power source 108 may include three phase AC power, which is directed into the rectifier 102 via three corresponding inputs (e.g., wires). As such, each phase of the AC power may be electrically coupled to a pair of transistors of the plurality of transistors 180. The pair of transistors corresponding to each of the phases of the AC power may correspond to a positive and a negative terminal of a load (e.g., the battery 100). While the illustrated embodiment of FIG. 8 shows the rectifier 102 receiving three-phase AC power and having six transistors of the plurality of transistors 180, it should be noted that the rectifier 102 may receive AC power having any suitable number of phases (e.g., 1, 2, 4, 5, 6, 7, 8, 9, 10, or more) and may include any suitable number transistors (e.g., 1, 2, 3, 4, 5, 7, 8, 9, 10, or more) of the plurality of transistors 180.

Figure 9:
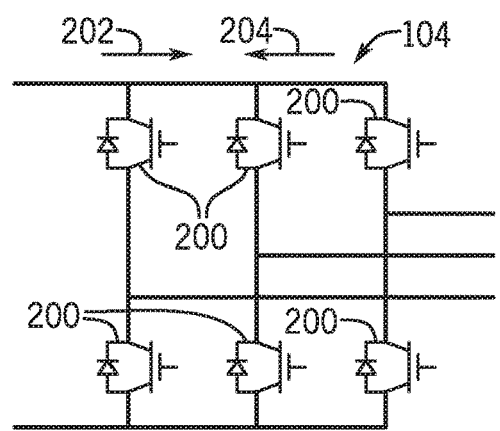
FIG. 9 is a schematic of an embodiment of an inverter of the variable speed drive of FIGS. 5 and 6, in accordance with an aspect of the present disclosure.

FIG. 9 is a schematic of an embodiment of the inverter 104, which may be included in the variable speed drive 52. Similar to the rectifier 102 of FIG. 8, the inverter 104 illustrated in FIG. 9 is active, in that the inverter 104 may convert DC power to AC power as well as convert AC power into DC power. For example, the inverter 104 includes a plurality of transistors 200 that convert DC power into AC power when current flows in a first direction 202. Additionally, the plurality of transistors 200 convert AC power into DC power when current flows in a second direction 204, opposite the first direction 202.

As shown in the illustrated embodiment of FIG. 9, the AC power directed to the motor 50 from the inverter may include three phase AC power. Each phase of the AC may be directed to the motor 50 via a corresponding input (e.g., wires). As such, each phase of the AC power may be electrically coupled to a pair of transistors of the plurality of transistors 200. The pair of transistors corresponding to each of the phases of the AC power may correspond to a positive and a negative terminal of a DC power source (e.g., the battery 100). While the illustrated embodiment of FIG. 9 shows the inverter 104 directing three-phase AC power and having six transistors of the plurality of transistors 200, it should be noted that the rectifier 102 may direct AC power to the motor 50 having any suitable number of phases (e.g., 1, 2, 4, 5, 6, 7, 8, 9, 10, or more) and may include any suitable number transistors (e.g., 1, 2, 3, 4, 5, 7, 8, 9, 10, or more) of the plurality of transistors 200.

Figure 10:
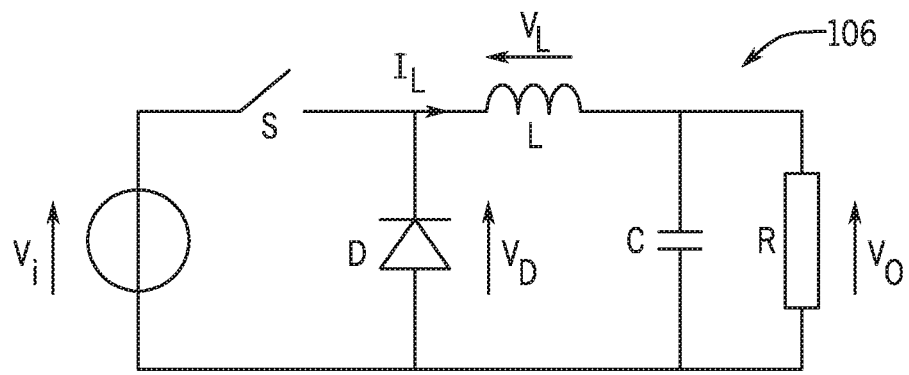
FIG. 10 is a schematic of an embodiment of a direct current (DC) bus of the variable speed drive of FIGS. 5 and 6, in accordance with an aspect of the present disclosure.
Figure 11:
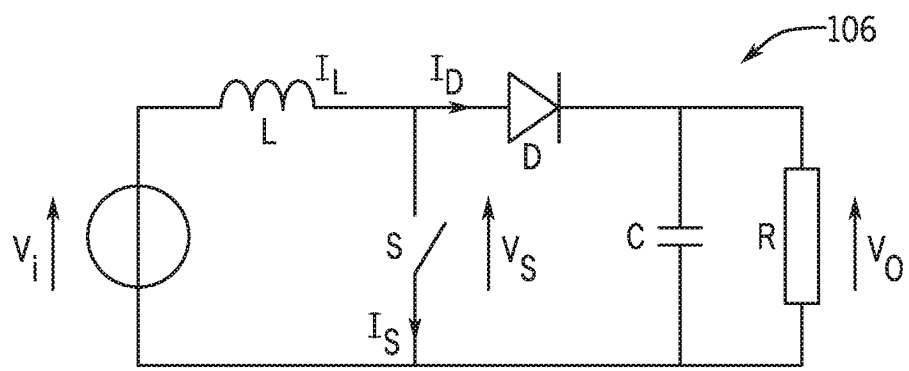
FIG. 11 is a schematic of an embodiment of a direct current (DC) bus of the variable speed drive of FIGS. 5 and 6, in accordance with an aspect of the present disclosure.
Figure 12:
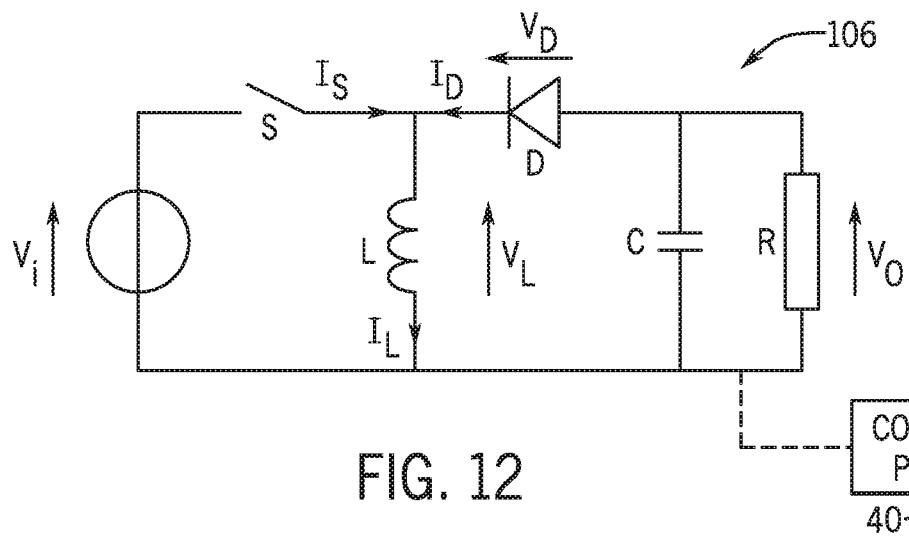
FIG. 12 is a schematic of an embodiment of a direct current (DC) bus of the variable speed drive of FIGS. 5 and 6, in accordance with an aspect of the present disclosure.

FIG. 10-12 are schematic representations of embodiments of the DC bus 106, which may be utilized to modify and/or manipulate DC power received from the rectifier 102 and/or from the battery 100. For example, FIG. 10 is a schematic of an embodiment of the DC bus 106 that is configured to reduce (e.g., buck) a voltage of DC power received by the DC bus 106. FIG. 11 is a schematic of an embodiment of the DC bus 106 that may increase (e.g., boost) a voltage of DC power received by the DC bus 106. Further, FIG. 12 is a schematic of an embodiment of the DC bus 106 that may both reduce (e.g., buck) and/or increase (e.g., boost) the voltage of the DC power received by the DC bus 106. In some embodiments, a magnitude of the current through the embodiment of the DC bus 106 shown in FIG. 12 may be adjusted by the control panel 40 based on feedback received from the variable speed drive 52, the motor 50, and/or the compressor 32. For example, the control panel 40 may receive feedback indicative of a speed of the motor 50 and/or a pressure of refrigerant exiting the compressor 32 and adjust a magnitude of the current through the DC bus 106 to increase or decrease the voltage of the DC power and adjust the speed of the motor based on the feedback. It should be noted that any combination of the embodiments of the DC bus 106 shown in FIGS. 10-12 may be utilized in the variable speed drive 52.

In any case, embodiments of the variable speed drive 52 of the present disclosure may be configured to operate in a variety of modes. For example, Table 1 below illustrates examples of various operating modes of the variable speed drive 52, which may be selected based on various parameters (e.g., a speed of the motor, a discharge pressure of the compressor 32, an input voltage of the AC power from the AC power source 108, a charge of the battery 100, among others). In Table 1, a "0" represents a component (e.g., the AC power source 108, the motor 50, and/or the battery 100) that does not receive or supply power, a "+" represents a component supplying power, and a "−" represents a component receiving power. While Table 1 includes thirteen operating modes of the variable speed drive 52, embodiments of the variable speed drive 52 of the present disclosure may include more than thirteen operating modes (e.g., 14, 15, 16, 17, 18, 19, 20, or more operating modes) or less than thirteen operating modes (e.g., 12, 11, 10, 9, 8, 7, 6, 5, 4, 3, 2, or 1 operating mode).

TABLE 1

Operating modes of the variable speed drive

| Mode | AC Power Source | Motor | Battery |
|---|---|---|---|
| Off | 0 | 0 | 0 |
| Normal drive | + | − | 0 |
| Regeneration to AC Power Source | − | + | 0 |
| Regeneration to Battery | 0 | + | − |
| Battery Driving Motor | 0 | − | + |
| Battery charging from AC Power Source | + | 0 | − |
| Power to AC Power Source from Battery | − | 0 | + |
| Motor operating and Battery charging | + | − | − |
| Charging Battery with AC Power Source and Motor | + | + | − |
| Power from AC Power Source and Battery to Motor | + | − | + |
| Regeneration from Motor to AC Power Source and Battery | − | + | − |
| Battery and | − | + | + |

TABLE 1-continued

Operating modes of the variable speed drive

| Mode | AC Power Source | Motor | Battery |
|---|---|---|---|
| regeneration to AC Power Source | | | |
| Battery to Motor and AC Power Source | − | − | + |

Figure 13:
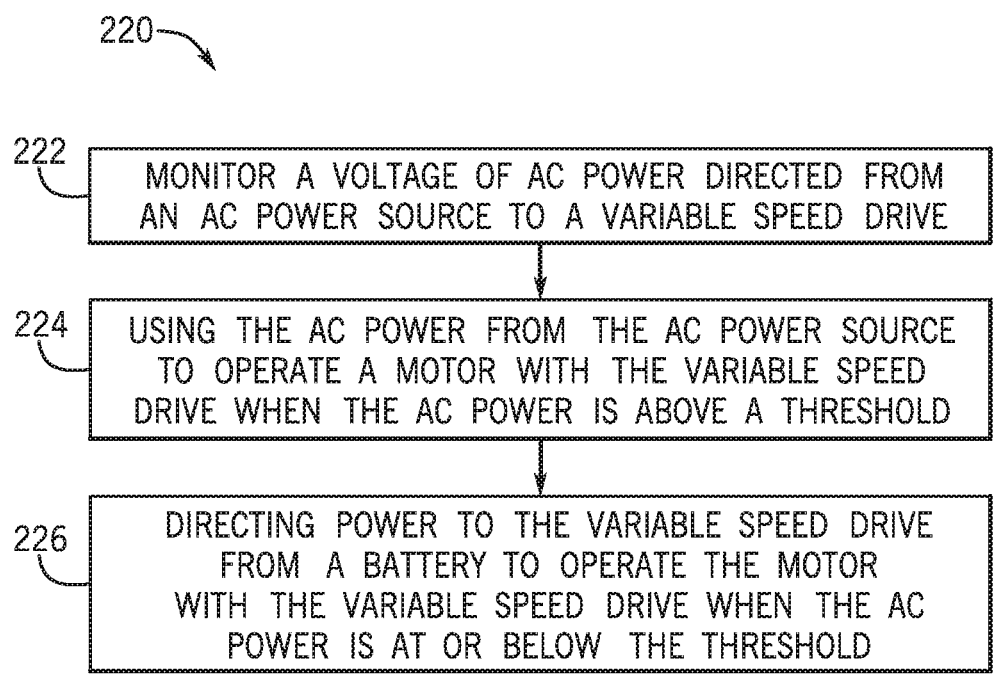
FIG. 13 is a block diagram of a method of operating the variable speed drive of FIGS. 5 and 6, in accordance with an aspect of the present disclosure.

FIG. 13 is a block diagram of a process 220 that may be utilized to operate the motor 50 using the variable speed drive 52 that receives power from the AC power source 108 and/or the battery 100. For example, at block 222, the control panel 40 may receive feedback from the sensor 120 indicative of the AC power supplied to the variable speed drive 52 from the AC power source 108. As discussed above, the feedback from the sensor 120 may include a voltage and/or a frequency of the AC power supplied by the AC power source 108. In any case, the control panel 40 may be configured to enable the variable speed drive 52 to utilize the AC power to operate the motor 50 when the feedback from the sensor 120 is above a threshold value (e.g., above a predetermined voltage and/or frequency), as shown at block 224. Further, at block 226, the control panel 40 may open the switch 116 and activate the battery 100 when the feedback from the sensor 120 reaches or falls below the threshold value. As such, the battery 100 may supply power to the variable speed drive 52, such that the motor 50 may continue to operate when the AC power from the AC power source 108 is interrupted, for example.

Additionally, as discussed above, the control panel 40 may also adjust operation of the variable speed drive 52 based on feedback received from one or more sensors disposed in the vapor compression system 14. For example, the control panel 40 may receive feedback indicative of a speed of the motor 50 and/or a discharge pressure of the compressor 32. The control panel may then adjust the circuitry 110 of the variable speed drive 52 (e.g., the switch 116, the battery 100, or another suitable component) to enable the speed of the motor 50 and/or the discharge pressure of the compressor 32 to reach a predetermined value.

As set forth above, the present disclosure may provide one or more technical effects useful in the operation of HVAC&R systems. Embodiments of the disclosure may include a battery that is electrically coupled to a variable speed drive and configured to supply power to a motor of an HVAC&R system. The battery may supply power in lieu of an AC power source when AC power from the AC power source is interrupted and/or when a cost of the AC power is relatively high. Additionally or alternatively, the battery may supplement power directed to the variable speed drive when a load demand (e.g., from the motor) is not satisfied by utilizing either the AC power source alone and/or the battery alone. Utilizing the battery of the variable speed drive may enhance operation of the variable speed drive and reduce shutdown and/or maintenance of the HVAC&R system. The technical effects and technical problems in the specification are examples and are not limiting. It should be noted that the embodiments described in the specification may have other technical effects and can solve other technical problems.

While only certain features and embodiments have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the exemplary embodiments, all features of an actual implementation may not have been described (i.e., those unrelated to the presently contemplated best mode of carrying out the disclosure, or those unrelated to enabling the claimed disclosure). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A heating, ventilating, air conditioning, and refrigeration (HVAC&R) system, comprising:
   a variable speed drive configured to supply power to a motor, wherein the motor is configured to drive a compressor of the HVAC&R system;
   a rectifier of the variable speed drive configured to receive alternating current (AC) power from an AC power source and convert the AC power to direct current (DC) power;
   a DC bus of the variable speed drive electrically coupled to the rectifier, wherein the DC bus is configured to modify the DC power received from the rectifier;
   an inverter of the variable speed drive electrically coupled to the DC bus, wherein the inverter is configured to convert the DC power from the DC bus to output AC power, wherein the output AC power comprises a variable voltage and a variable frequency, wherein the output AC power is directed to the motor, wherein the rectifier and the inverter are active and enable current flow through the rectifier and the inverter in a first direction and in a second direction, and wherein the first direction is opposite the second direction; and
   a battery electrically coupled to the DC bus of the variable speed drive, wherein the battery is configured to provide auxiliary DC power to the variable speed drive.

2. The system of claim 1, wherein the rectifier comprises a first plurality of transistors, and wherein the inverter comprises a second plurality of transistors.

3. The system of claim 1, wherein the motor is configured to provide DC power to the battery to charge the battery.

4. The system of claim 1, comprising a charger coupled to the battery and the AC power source, wherein the charger is configured to receive and condition AC power from the AC power source and supply DC power to the battery.

5. The system of claim 4, comprising a switch, wherein the switch is configured to open when a voltage of the AC power from the AC power source reaches a threshold.

6. The system of claim 5, comprising a diode disposed between the battery and the DC bus, wherein the diode is configured to block current from flowing from the DC bus to the battery.

7. The system of claim 1, wherein the DC bus is configured to amplify a voltage of the DC power, or reduce a voltage of the DC power, or both.

8. The system of claim 1, wherein the AC power from the AC power source comprises three-phase AC power.

9. The system of claim 1, wherein the battery is configured to supply between 500 kW and 25,000 kW of DC power to the variable speed drive.

10. A variable speed drive for a heating, ventilating, air conditioning, and refrigeration (HVAC&R) system, comprising:
- a rectifier of the variable speed drive configured to receive alternating current (AC) power from an AC power source and convert the AC power to direct current (DC) power;
- a DC bus of the variable speed drive electrically coupled to the rectifier, wherein the DC bus is configured to amplify or reduce a voltage of the DC power received from the rectifier;
- an inverter of the variable speed drive electrically coupled to the DC bus, wherein the inverter is configured to convert the DC power from the DC bus to output AC power, wherein the output AC power comprises a variable voltage and a variable frequency, and wherein the output AC power is directed to the motor;
- a battery electrically coupled to the DC bus of the variable speed drive, wherein the battery is configured to provide auxiliary DC power to the variable speed drive;
- a switch configured to open when a voltage of the AC power from the AC power source reaches a threshold; and
- a charger electrically coupled to the AC power source and the battery, wherein the charger is configured to receive AC power from the AC power source and provide DC power to the battery.

11. The system of claim 10, comprising a diode disposed between the battery and the DC bus, wherein the diode is configured to block current from flowing from the DC bus to the battery.

12. The system of claim 10, wherein the rectifier comprises a plurality of diodes configured to convert the AC power to DC power.

13. The system of claim 10, wherein the AC power from the AC power source comprises three-phase AC power.

14. The system of claim 10, wherein the battery is configured to supply between 500 kW and 25,000 kW of DC power to the variable speed drive.

15. A method, comprising:
- monitoring a voltage of alternating current (AC) power directed from an AC power source to a variable speed drive;
- using the AC power from the AC power source to operate a motor with the variable speed drive when the AC power is above a threshold; and
- directing power to the variable speed drive from a battery to operate the motor with the variable speed drive when the AC power is at or below the threshold.

16. The method of claim 15, comprising monitoring a speed of the motor receiving power from the variable speed drive, or monitoring a discharge pressure of a compressor driven by the motor, or both.

17. The method of claim 16, comprising selectively supplying power from the AC power source and the battery based on the speed of the motor, or the discharge pressure of the compressor, or both.

18. The method of claim 15, comprising receiving power in a charger from the AC power source.

* * * * *